US012095090B2

(12) United States Patent
Masuda

(10) Patent No.: US 12,095,090 B2
(45) Date of Patent: Sep. 17, 2024

(54) BINDER COMPOSITION FOR ELECTROCHEMICAL DEVICE, SLURRY COMPOSITION FOR ELECTROCHEMICAL DEVICE, FUNCTIONAL LAYER FOR ELECTROCHEMICAL DEVICE, AND ELECTROCHEMICAL DEVICE

(71) Applicant: ZEON CORPORATION, Tokyo (JP)

(72) Inventor: Ai Masuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 906 days.

(21) Appl. No.: 16/963,251

(22) PCT Filed: Feb. 5, 2019

(86) PCT No.: PCT/JP2019/004100
§ 371 (c)(1),
(2) Date: Jul. 20, 2020

(87) PCT Pub. No.: WO2019/156086
PCT Pub. Date: Aug. 15, 2019

(65) Prior Publication Data
US 2021/0050594 A1 Feb. 18, 2021

(30) Foreign Application Priority Data
Feb. 7, 2018 (JP) .................. 2018-020410

(51) Int. Cl.
H01M 4/62 (2006.01)
C08G 69/44 (2006.01)
H01M 10/05 (2010.01)
H01M 10/0525 (2010.01)
H01M 50/411 (2021.01)
H01M 50/44 (2021.01)
H01M 50/443 (2021.01)
H01M 50/491 (2021.01)
H01G 11/30 (2013.01)

(52) U.S. Cl.
CPC ............ H01M 4/622 (2013.01); C08G 69/44 (2013.01); H01M 10/0525 (2013.01); H01M 50/411 (2021.01); H01M 50/443 (2021.01); H01M 50/491 (2021.01); H01G 11/30 (2013.01)

(58) Field of Classification Search
None
See application file for complete search history.

(56) References Cited

U.S. PATENT DOCUMENTS

2013/0330622 A1   12/2013 Sasaki
2017/0062828 A1   3/2017 Sonobe et al.

FOREIGN PATENT DOCUMENTS

| CN | 101260282 A | | 9/2008 | |
|---|---|---|---|---|
| EP | 2372811 | * | 2/2015 | .......... H01M 50/489 |
| JP | 2005139405 | * | 6/2005 | ............ C08F 265/10 |
| JP | 2005139405 A | | 6/2005 | |
| JP | 2010521798 A | | 6/2010 | |
| JP | 5002052 B2 | * | 8/2012 | .............. H01M 4/13 |
| JP | 2012204303 | * | 10/2012 | ............ H01M 4/139 |
| JP | 2012204303 A | | 10/2012 | |
| JP | 2013145763 A | | 7/2013 | |
| JP | 2015070245 | * | 4/2015 | .............. H01G 11/38 |
| JP | 2018006333 A | * | 1/2018 | .............. H01M 4/13 |
| JP | 2018006333 | * | 11/2018 | .............. H01M 4/13 |
| WO | 2012115096 A1 | | 8/2012 | |
| WO | 2015186363 A1 | | 12/2015 | |

OTHER PUBLICATIONS

Aug. 11, 2020, International Preliminary Report on Patentability issued in the International Patent Application No. PCT/JP2019/004100.
Mar. 12, 2019, International Search Report issued in the International Patent Application No. PCT/JP2019/004100.
Sep. 14, 2021, the Extended European Search Report issued by the European Patent Office in the corresponding European Patent Application No. 19750401.2.
Janne Virtanen et al., Studies on Copolymerization of N-Isopropylacrylamide and Glycidyl Methacrylate, Journal of Polymer Science Part A. Polymer Chemistry, Jan. 1, 2001, pp. 3716-3725, vol. 39, No. 21.

* cited by examiner

Primary Examiner — Maria Laios
Assistant Examiner — Angela J Martin
(74) Attorney, Agent, or Firm — KENJA IP LAW PC

(57) ABSTRACT

A binder composition for an electrochemical device contains a polymer A and water. In the polymer A of the binder composition for an electrochemical device, the content of an amide group-containing monomer unit is not less than 10 mass % and not more than 90 mass %, and the content of an epoxy group-containing monomer unit is not less than 0.1 mass % and not more than 50 mass %.

6 Claims, No Drawings

BINDER COMPOSITION FOR ELECTROCHEMICAL DEVICE, SLURRY COMPOSITION FOR ELECTROCHEMICAL DEVICE, FUNCTIONAL LAYER FOR ELECTROCHEMICAL DEVICE, AND ELECTROCHEMICAL DEVICE

TECHNICAL FIELD

The present disclosure relates to a binder composition for an electrochemical device, a slurry composition for an electrochemical device, a functional layer for an electrochemical device, and an electrochemical device.

BACKGROUND

Non-aqueous secondary batteries (hereinafter, also referred to simply as "secondary batteries"), such as lithium ion secondary batteries, and capacitors, such as electric double-layer capacitors and lithium ion capacitors, are examples of electrochemical devices that are conventionally used in a wide range of applications.

Non-aqueous secondary batteries have characteristics such as compact size, light weight, high energy-density, and the ability to be repeatedly charged and discharged, and are used in a wide range of applications. Consequently, in recent years, studies have been made to improve battery members such as electrodes with the aim of achieving even higher non-aqueous secondary battery performance.

A battery member of a secondary battery may be a member that includes a functional layer containing a binder and also optionally containing particles that are compounded in order to cause the battery member to display a desired function (hereinafter, referred to as "functional particles").

Specifically, a separator that includes an adhesive layer containing a binder and/or a porous membrane layer containing a binder and non-conductive particles as functional particles on a separator substrate may be used as a separator of a secondary battery. Moreover, an electrode that includes an electrode mixed material layer containing a binder and electrode active material particles as functional particles on a current collector or an electrode that further includes an adhesive layer and/or porous membrane layer such as described above on an electrode substrate including an electrode mixed material layer on a current collector may be used as an electrode of a secondary battery.

Such functional layer-containing battery members are produced by, for example, applying a slurry composition containing functional particles, a binder composition that contains a binder, and so forth, onto a separator substrate, a current collector, or an electrode substrate, and then drying the slurry composition that has been applied.

In recent years, attempts have been made to improve slurry compositions and binder compositions used in functional layer formation in order to achieve further improvement of secondary battery performance.

In one example, Patent Literature (PTL) 1 proposes a technique that can lower the internal resistance of a lithium ion secondary battery including an electrode and can also cause the lithium ion secondary battery to display excellent life characteristics by forming the electrode using, as a binder composition for an electrode in production of a secondary battery, a binder composition containing a copolymer that has a degree of swelling in electrolyte solution that is within a specific range and that is obtained through copolymerization of a monomer composition containing, in specific proportions, an ethylenically unsaturated carboxylic acid and/or salt thereof, and a copolymerizable compound that includes an ethylenically unsaturated bond and that has a solubility of 7 g or more in 100 g of water at 20° C.

CITATION LIST

Patent Literature

PTL 1: WO2015/186363A1

SUMMARY

Technical Problem

However, the conventional technique described above leaves room for improvement in terms of further improving coatability of a slurry composition.

Accordingly, one object of the present disclosure is to provide a slurry composition for an electrochemical device having excellent coatability and a binder composition for an electrochemical device with which the slurry composition can be produced.

Another object of the present disclosure is to use this slurry composition for an electrochemical device to provide a functional layer for an electrochemical device that can cause an electrochemical device to display excellent cycle characteristics and an electrochemical device that includes the functional layer for an electrochemical device.

Solution to Problem

Through extensive studies, the inventor discovered that a slurry composition for an electrochemical device having improved coatability can be produced by using a binder composition that contains water and a specific polymer A, and, in this manner, completed the present disclosure.

Specifically, the present disclosure aims to advantageously solve the problem set forth above, and a presently disclosed binder composition for an electrochemical device comprises a polymer A and water, wherein the polymer A includes an amide group-containing monomer unit and an epoxy group-containing monomer unit, content of the amide group-containing monomer unit in the polymer A is not less than 10 mass % and not more than 90 mass %, and content of the epoxy group-containing monomer unit in the polymer A is not less than 0.1 mass % and not more than 50 mass %. By using a binder composition for an electrochemical device that contains water and a polymer A including a specific amount of an amide group-containing monomer unit and a specific amount of an epoxy group-containing monomer unit in this manner, it is possible to improve the coatability of a slurry composition for an electrochemical device that is produced using the binder composition for an electrochemical device.

The phrase "includes a monomer unit" as used in the present disclosure means that "a polymer obtained with the monomer includes a repeating unit derived from the monomer".

Moreover, the "proportional content of an amide group-containing monomer unit" and the "proportional content of an epoxy group-containing monomer unit" referred to in the present disclosure can be measured by a nuclear magnetic resonance (NMR) method such as $^1$H-NMR.

In the presently disclosed binder composition for an electrochemical device, the polymer A preferably has a weight-average molecular weight of not less than 50,000 and not more than 5,000,000. When the weight-average molecular weight of the polymer A is not less than 50,000 and not more than 5,000,000, coatability of a slurry composition for an electrochemical device can be further improved, and slurry dispersibility can be improved.

Note that the "weight-average molecular weight of a polymer A" referred to in the present disclosure can be measured by a method described in the EXAMPLES section of the present specification.

Moreover, the present disclosure aims to advantageously solve the problem set forth above, and a presently disclosed slurry composition for an electrochemical device comprises any one of the binder compositions for an electrochemical device set forth above. A slurry composition for an electrochemical device that contains any one of the binder compositions for an electrochemical device set forth above in this manner has excellent coatability and can form a functional layer that can cause an electrochemical device to display excellent cycle characteristics.

The presently disclosed slurry composition for an electrochemical device preferably further comprises an electrode active material. When the slurry composition further contains an electrode active material, the slurry composition can form an electrode mixed material layer that can cause a secondary battery (i.e., an electrochemical device) to display excellent cycle characteristics.

Furthermore, the present disclosure aims to advantageously solve the problem set forth above, and a presently disclosed functional layer for an electrochemical device is formed using any one of the slurry compositions for an electrochemical device set forth above. A functional layer for an electrochemical device that is formed using any one of the slurry compositions for an electrochemical device set forth above in this manner can cause an electrochemical device to display excellent cycle characteristics.

Also, the present disclosure aims to advantageously solve the problem set forth above, and a presently disclosed electrochemical device comprises a positive electrode, a negative electrode, a separator, and an electrolyte solution, wherein at least one of the positive electrode, the negative electrode, and the separator includes the functional layer for an electrochemical device set forth above. Cycle characteristics of the electrochemical device can be improved as a result of at least one of the positive electrode, the negative electrode, and the separator including the functional layer for an electrochemical device set forth above in this manner.

Advantageous Effect

According to the present disclosure, it is possible to provide a slurry composition for an electrochemical device having excellent coatability and a binder composition for an electrochemical device with which the slurry composition can be produced.

Moreover, according to the present disclosure, it is possible to use this slurry composition for an electrochemical device to provide a functional layer for an electrochemical device that can cause an electrochemical device to display excellent cycle characteristics and an electrochemical device that includes the functional layer for an electrochemical device.

DETAILED DESCRIPTION

The following provides a detailed description of embodiments of the present disclosure.

The presently disclosed binder composition for an electrochemical device (hereinafter, also referred to simply as a "binder composition") is a binder composition that is used in formation of a functional layer formed (i) on a current collector of an electrode, (ii) on an electrode mixed material layer formed on the aforementioned current collector (i.e., on an electrode substrate), or (iii) on a separator substrate. The presently disclosed slurry composition for an electrochemical device (hereinafter, also referred to simply as a "slurry composition") contains the presently disclosed binder composition for an electrochemical device and is used as a material in production of the presently disclosed functional layer for an electrochemical device. Moreover, the presently disclosed functional layer for an electrochemical device is produced using the presently disclosed slurry composition for an electrochemical device and may constitute part of a separator or an electrode, for example. Furthermore, the presently disclosed electrochemical device is an electrochemical device that includes the presently disclosed functional layer for an electrochemical device.

(Binder Composition for Electrochemical Device)

The presently disclosed binder composition for an electrochemical device contains a polymer A and an aqueous medium, and can optionally further contain a polymer B and/or other components. Features of the presently disclosed binder composition for an electrochemical device are that the polymer A includes an amide group-containing monomer unit and an epoxy group-containing monomer unit, the content of the amide group-containing monomer unit in the polymer A is not less than 10 mass % and not more than 90 mass %, and the content of the epoxy group-containing monomer unit in the polymer A is not less than 0.1 mass % and not more than 50 mass %.

The coatability of a slurry composition for an electrochemical device can be improved through inclusion of the presently disclosed binder composition for an electrochemical device in the slurry composition for an electrochemical device. The following provides a description of the presently disclosed binder composition for an electrochemical device using, as an example, a case in which the binder composition for an electrochemical device is used to form a functional layer.

<Polymer A>

The polymer A includes an amide group-containing monomer unit and an epoxy group-containing monomer unit, and may optionally include other monomer units besides the amide group-containing monomer unit and the epoxy group-containing monomer unit. As a result of the polymer A having a monomeric composition such as set forth above, it is possible to improve the coatability of a slurry composition for an electrochemical device that contains the binder composition for an electrochemical device containing the polymer A.

The polymer A is preferably a water-dispersible polymer or a water-soluble polymer, and is more preferably a water-soluble polymer. Slurry dispersibility and functional layer adhesiveness can be improved through the polymer A being a water-dispersible polymer or a water-soluble polymer.

The term "water-soluble" means that when 0.5 g of the polymer is dissolved in 100 g of water at 25° C., insoluble content is less than 0.5 mass %.

[Amide Group-Containing Monomer Unit]

Examples of amide group-containing monomers that can form the amide group-containing monomer unit include, without any specific limitations, any compound that includes an amide group and a group that is copolymerizable with another monomer (for example, a group including a carbon-carbon unsaturated bond, such as a vinyl group), with a compound that includes an amide group and one group that is copolymerizable with another monomer being preferable. Moreover, a compound that includes an amide group and one carbon-carbon double bond (i.e., an amide group-containing monovinyl compound) is more preferable. Examples of amide group-containing monovinyl compounds include N-vinylacetamide, acrylamide, 2-acrylamido-2-methylpropane sulfonic acid (AMPS), and N-methylol (meth)acrylamide. Of these amide group-containing monovinyl compounds, N-vinylacetamide and acrylamide are preferable from a viewpoint of ensuring dispersibility of functional particles in a slurry composition for an electrochemical device and improving output characteristics and cycle characteristics. Moreover, acrylamide is more preferable from a viewpoint of further improving output characteristics of a lithium ion secondary battery. In other words, the polymer A preferably includes either or both of an N-vinylacetamide monomer unit and an acrylamide monomer unit as the amide group-containing monomer unit, and more preferably includes an acrylamide monomer unit as the amide group-containing monomer unit.

Note that one of these amide group-containing monomers may be used individually, or two or more of these amide group-containing monomers may be used in combination in a freely selected ratio.

The content of the amide group-containing monomer unit in the polymer A (i.e., the proportion constituted by the amide group-containing monomer unit among all monomer units included in the polymer A) is required to be 10 mass % or more, and is preferably 30 mass % or more, more preferably 45 mass % or more, and even more preferably 65 mass % or more. Moreover, the content of the amide group-containing monomer unit in the polymer A is required to be 90 mass % or less, and is preferably 80 mass % or less. When the content of the amide group-containing monomer unit in the polymer A is not less than any of the lower limits set forth above, reduction of hydrophilicity of the polymer A can be inhibited, and reduction of slurry dispersibility can be inhibited. On the other hand, when the content of the amide group-containing monomer unit in the polymer A is not more than any of the upper limits set forth above, reduction of thixotropy can be inhibited, and coatability of a slurry composition for an electrochemical device can be improved.

[Epoxy Group-Containing Monomer Unit]

Examples of epoxy group-containing monomers that can form the epoxy group-containing monomer unit include epoxy group-containing unsaturated compounds that display radical polymerizability. The epoxy group may be an oxiranyl group (1,2-epoxy structure) or an oxetanyl group (1,3-epoxy structure).

Examples of unsaturated compounds that include an oxiranyl group include glycidyl acrylate, glycidyl methacrylate, 2-methylglycidyl methacrylate, glycidyl α-ethylacrylate, glycidyl α-n-propylacrylate, glycidyl α-n-butylacrylate, 3,4-epoxybutyl acrylate, 3,4-epoxybutyl methacrylate, 6,7-epoxyheptyl acrylate, 6,7-epoxyheptyl methacrylate, 6,7-epoxyheptyl α-ethylacrylate, o-vinylbenzyl glycidyl ether, m-vinylbenzyl glycidyl ether, p-vinylbenzyl glycidyl ether, 3,4-epoxycyclohexylmethyl methacrylate, allyl glycidyl ether (AGE), vinyl glycidyl ether (VGE), and glycidyl methacrylate (GMA). Of these compounds, glycidyl methacrylate 2-methylglycidyl methacrylate, 6,7-epoxyheptyl methacrylate, o-vinylbenzyl glycidyl ether, m-vinylbenzyl glycidyl ether, p-vinylbenzyl glycidyl ether, and 3,4-epoxycyclohexyl methacrylate are preferable from a viewpoint of improving copolymerization reactivity.

Examples of unsaturated compounds that include an oxetanyl group include:

acrylic acid esters such as 3-(acryloyloxymethyl)oxetane, 3-(acryloyloxymethyl)-2-methyloxetane, 3-(acryloyloxymethyl)-3-ethyloxetane, 3-(acryloyloxymethyl)-2-trifluoromethyloxetane, 3-(acryloyloxymethyl)-2-pentafluoroethyloxetane, 3-(acryloyloxymethyl)-2-phenyloxetane, 3-(acryloyloxymethyl)-2,2-difluorooxetane, 3-(acryloyloxymethyl)-2,2,4-trifluorooxetane, 3-(acryloyloxymethyl)-2,2,4,4-tetrafluorooxetane, 3-(2-acryloyloxyethyl)oxetane, 3-(2-acryloyloxyethyl)-2-ethyloxetane, 3-(2-acryloyloxyethyl)-3-ethyloxetane, 3-(2-acryloyloxyethyl)-2-trifluoromethyloxetane, 3-(2-acryloyloxyethyl)-2-pentafluoroethyloxetane, 3-(2-acryloyloxyethyl)-2-phenyloxetane, 3-(2-acryloyloxyethyl)-2,2-difluorooxetane, 3-(2-acryloyloxyethyl)-2,2,4-trifluorooxetane, and 3-(2-acryloyloxyethyl)-2,2,4,4-tetrafluorooxetane; and methacrylic acid esters such as 3-(methacryloyloxymethyl) oxetane, 3-(methacryloyloxymethyl)-2-methyloxetane, 3-(methacryloyloxymethyl)-3-ethyloxetane, 3-(methacryloyloxymethyl)-2-trifluoromethyloxetane, 3-(methacryloyloxymethyl)-2-pentafluoroethyloxetane, 3-(methacryloyloxymethyl)-2-phenyloxetane, 3-(methacryloyloxymethyl)-2,2-difluorooxetane, 3-(methacryloyloxymethyl)-2,2,4-trifluorooxetane, 3-(methacryloyloxymethyl)-2,2,4,4-tetrafluorooxetane, 3-(2-methacryloyloxyethyl)oxetane, 3-(2-methacryloyloxyethyl)-2-ethyloxetane, 3-(2-methacryloyloxyethyl)-3-ethyloxetane, 3-(2-methacryloyloxyethyl)-2-trifluoromethyloxetane, 3-(2-methacryloyloxyethyl)-2-pentafluoroethyloxetane, 3-(2-methacryloyloxyethyl)-2-phenyloxetane, 3-(2-methacryloyloxyethyl)-2,2-difluorooxetane, 3-(2-methacryloyloxyethyl)-2,2,4-trifluorooxetane, and 3-(2-methacryloyloxyethyl)-2,2,4,4-tetrafluorooxetane.

One of these unsaturated compounds may be used individually, or two or more of these unsaturated compounds may be used in combination in a freely selected ratio. Of these unsaturated compounds, allyl glycidyl ether (AGE), vinyl glycidyl ether (VGE), and glycidyl methacrylate (GMA) are preferable from a viewpoint of further improving cycle characteristics, with glycidyl methacrylate (GMA) being more preferable.

The content of the epoxy group-containing monomer unit in the polymer A (i.e., the proportion constituted by the epoxy group-containing monomer unit among all monomer units included in the polymer A) is required to be 0.1 mass % or more, and is preferably 1 mass % or more, more preferably 1.5 mass % or more, and even more preferably 3 mass % or more. Moreover, the content of the epoxy group-containing monomer unit in the polymer A is required to be 50 mass % or less, and is preferably 30 mass % or less, more preferably 20 mass % or less, and even more preferably 10 mass % or less. When the content of the epoxy group-containing monomer unit in the polymer A is not less than any of the lower limits set forth above, reduction of electrolyte solution penetrability (electrolyte solution wettability) of a functional layer can be inhibited, and deterioration of cycle characteristics can be inhibited. On the other hand, when the content of the epoxy group-containing monomer unit in the polymer A is not more than any of the upper limits set forth above, it is possible to inhibit a rise in viscosity of a slurry composition for an electrochemical device and increase dispersibility of the slurry composition, and also to improve coatability of the slurry composition for an electrochemical device.

The content ratio of the epoxy group-containing monomer unit relative to the amide group-containing monomer unit (content of epoxy group-containing monomer unit/content of amide group-containing monomer unit), as a mass ratio, is preferably 0.01 or more, and more preferably 0.05 or more, and is preferably 0.25 or less, and more preferably 0.10 or less. When the mass ratio is within any of the ranges set forth above, it is possible to achieve a balance of both good slurry dispersibility and coatability.

[Other Monomer Units]

The polymer A may include other monomer units besides the amide group-containing monomer unit and the epoxy group-containing monomer unit. Examples of monomer units other than the amide group-containing monomer unit and the epoxy group-containing monomer unit include, but are not specifically limited to, an acid group-containing monomer unit, a hydroxyl group-containing monomer unit, a (meth)acrylic acid ester monomer unit, an aromatic vinyl monomer unit, and a conjugated diene monomer unit. Of these other monomer units, an acid group-containing monomer unit is preferably included in the polymer A from a viewpoint of further improving coatability of a slurry composition and cycle characteristics of an electrochemical device. Note that one of these types of other monomer units may be used individually, or two or more of these types of other monomer units may be used in combination in a freely selected ratio.

[[Acid Group-Containing Monomer Unit]]

Examples of acid group-containing monomers that can form the acid group-containing monomer unit include, without any specific limitations, any monomer that includes an acid group, such as carboxyl group (carboxylic acid group) containing monomers, sulfo group-containing monomers, and phosphate group-containing monomers.

Examples of carboxyl group-containing monomers include monocarboxylic acids, dicarboxylic acids, and salts (sodium salts, lithium salts, etc.) of monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include styrene sulfonic acid, vinyl sulfonic acid, methyl vinyl sulfonic acid, (meth)allyl sulfonic acid, (meth)acrylic acid 2-sulfoethyl, 3-allyloxy-2-hydroxypropane sulfonic acid, and salts (lithium salts, sodium salts, etc.) of the preceding examples.

Note that in the present disclosure, "(meth)allyl" is used to indicate "allyl" and/or "methallyl", whereas "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, ethyl-(meth)acryloyloxyethyl phosphate, and salts (sodium salts, lithium salts, etc.) of the preceding examples. Note that in the present disclosure, "(meth)acryloyl" is used to indicate "acryloyl" and/or "methacryloyl".

Of these acid group-containing monomers, carboxyl group-containing monomers are preferable from a viewpoint of copolymerizability in the polymer A and slurry stability, with methacrylic acid, acrylic acid, and itaconic acid being more preferable, and acrylic acid being even more preferable.

The content of the acid group-containing monomer unit (i.e., the proportion constituted by the acid group-containing monomer unit among all monomer units included in the polymer A) is preferably 0.1 mass % or more, and more preferably 10 mass % or more, and is preferably 40 mass % or less, and more preferably 35 mass % or less. When the content of the acid group-containing monomer unit in the polymer A is within any of the ranges set forth above, coatability can be further improved.

[[Hydroxyl Group-Containing Monomer Unit]]

Examples of hydroxyl group-containing monomers that can form the hydroxyl group-containing monomer unit include hydroxyl group-containing vinyl monomers.

The hydroxyl group-containing vinyl monomer may, without any specific limitations, be any monofunctional compound that includes a hydroxyl group (—OH) and a vinyl group (—CH=CH$_2$) and in which the number of ethylenically unsaturated bonds (C=C) of the vinyl group is one per molecule.

Examples of hydroxyl group-containing vinyl monomers include 2-hydroxyethyl acrylate, 2-hydroxyethyl methacrylate, 2-hydroxypropyl acrylate, and 2-hydroxypropyl methacrylate. One of these hydroxyl group-containing vinyl monomers may be used individually, or two or more of these hydroxyl group-containing vinyl monomers may be used in combination in a freely selected ratio. Of these hydroxyl group-containing vinyl monomers, 2-hydroxyethyl acrylate, 2-hydroxyethyl methacrylate, 2-hydroxypropyl acrylate, and 2-hydroxypropyl methacrylate are preferable from a viewpoint of improving adhesiveness of a functional layer, with 2-hydroxyethyl acrylate and 2-hydroxyethyl methacrylate being more preferable.

[[(Meth)Acrylic Acid Ester Monomer Unit]]

Examples of (meth)acrylic acid ester monomers that can form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, and cyclohexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination. Of these (meth)acrylic acid ester monomers, acrylic acid alkyl esters are preferable, and 2-ethylhexyl acrylate is more preferable.

[[Aromatic Vinyl Monomer Unit]]

Examples of aromatic vinyl monomers that can form the aromatic vinyl monomer unit include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable.

The content of other monomer units in the polymer A (i.e., the proportion constituted by other monomer units among all monomer units included in the polymer A) is preferably 0.1 mass % or more, and more preferably 10 mass % or more, and is preferably 40 mass % or less, and more preferably 35 mass % or less. By setting the content of other monomer units in the polymer A within any of the ranges set forth above, coatability of a slurry composition can be further improved even when the polymer A includes an acid group-containing monomer unit.

Note that the content of other monomer units in the polymer A (i.e., the proportion constituted by other monomer units among all monomer units included in the polymer A) can be measured by a nuclear magnetic resonance (NMR) method such as $^1$H-NMR.

[Production Method of Polymer A]

The polymer A can be produced through polymerization of a monomer composition containing the monomers set forth above, carried out in an aqueous solvent such as water, for example. The proportional content of each monomer in the monomer composition can be set in accordance with the content (proportional content) of each repeating unit (monomer unit) in the polymer A.

The polymerization method is not specifically limited, and any of solution polymerization, suspension polymerization, bulk polymerization, and emulsion polymerization may be used. Moreover, ionic polymerization, radical polymerization, living radical polymerization, or the like can be adopted as the polymerization reaction.

Additives such as emulsifiers, dispersants, polymerization initiators, and polymerization aids used in the polymerization may be the same as typically used. Moreover, these additives may be used in the same amounts as typically used. The polymerization conditions can be adjusted as appropriate depending on the polymerization method, the type of polymerization initiator, and so forth.

[Properties of Polymer A]

The weight-average molecular weight of the polymer A is preferably 50,000 or more, more preferably 100,000 or more, and particularly preferably 200,000 or more, and is preferably 5,000,000 or less, more preferably 4,000,000 or less, and particularly preferably 3,000,000 or less. When the weight-average molecular weight of the polymer A is not less than any of the lower limits set forth above, coatability of a slurry composition can be further improved. On the other hand, when the weight-average molecular weight of the polymer A is not more than any of the upper limits set forth above, slurry dispersibility can be improved.

<Polymer B>

The polymer B that can optionally be used may be any polymer other than the polymer A set forth above without any specific limitations and can be any known polymer that can be used as a binder in the field of electrochemical devices. Specifically, the polymer B is preferably a conjugated diene polymer or an acrylic polymer, and more preferably a conjugated diene polymer.

Note that the polymer B is preferably insoluble rather than soluble.

The term "insoluble" as used herein means that when 0.5 g of the polymer is dissolved in 100 g of water at 25° C., insoluble content is 95 mass %.

A conjugated diene polymer that can suitably be used as the polymer B includes either or both of an aliphatic conjugated diene monomer unit and a linear alkylene structural unit, and may include both an aliphatic conjugated diene monomer unit and a linear alkylene structural unit. The binder composition may optionally contain a polymer including a monomer unit other than an aliphatic conjugated diene monomer unit and a linear alkylene structural unit, such as a polymer that includes an aliphatic conjugated diene monomer unit and an aromatic vinyl monomer unit or a polymer that includes an aliphatic conjugated diene monomer unit, an aromatic vinyl monomer unit, and an ethylenically unsaturated carboxylic acid monomer unit. When the polymer B has a monomeric composition such as described above, it is possible to improve adhesive strength of a functional layer that is formed using a produced slurry composition for an electrochemical device.

[Aliphatic Conjugated Diene Monomer Unit]

Examples of aliphatic conjugated diene monomers that can form an aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene and isoprene are preferable, and 1,3-butadiene is more preferable from a viewpoint of flexibility and adhesive strength of a functional layer. Note that one aliphatic conjugated diene monomer may be used individually, or two or more aliphatic conjugated diene monomers may be used in combination in a freely selected ratio.

The content of the aliphatic conjugated diene monomer unit in the polymer B (i.e., the proportion constituted by the aliphatic conjugated diene monomer unit among all monomer units included in the polymer B) is preferably 15 mass % or more, and more preferably 20 mass % or more, and is preferably 60 mass % or less, and more preferably 50 mass % or less. When the content of the aliphatic conjugated diene monomer unit in the polymer B is not less than any of the lower limits set forth above, a functional layer can be provided with good flexibility. On the other hand, when the content of the aliphatic conjugated diene monomer unit in the polymer B is not more than any of the upper limits set forth above, a functional layer can be provided with good adhesiveness.

Note that the content of the aliphatic conjugated diene monomer unit in the polymer B (i.e., the proportion constituted by the aliphatic conjugated diene monomer unit among all monomer units included in the polymer B) can be measured by a nuclear magnetic resonance (NMR) method such as $^1$H-NMR.

[Linear Alkylene Structural Unit]

A linear alkylene structural unit is a repeating unit that is composed of only an alkylene structure represented by a general formula —$C_nH_{2n}$— (n is an integer of 2 or more). The linear alkylene structural unit has a straight chain form.

The method by which the linear alkylene structural unit is introduced into the polymer B is not specifically limited and may be either of the following methods (1) or (2), for example.

(1) A method in which a polymer including a conjugated diene monomer unit is produced from a monomer composition containing a conjugated diene monomer and then the polymer is hydrogenated to convert the conjugated diene monomer unit to an alkylene structural unit (2) A method in which a polymer is produced from a monomer composition containing a 1-olefin monomer Of these methods, method (1) is preferable because production of the polymer is easy.

The conjugated diene monomer may be 1,3-butadiene, 1,3-pentadiene, or the like, for example. Of these conjugated diene monomers, 1,3-butadiene is preferable. In other words, the linear alkylene structural unit is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit).

Moreover, the 1-olefin monomer may be ethylene, propylene, 1-butene, 1-hexene, or the like, for example.

One of these conjugated diene monomers or 1-olefin monomers can be used individually, or two or more of these conjugated diene monomers or 1-olefin monomers can be used in combination.

The content of the linear alkylene structural unit in the polymer B (i.e., the proportion constituted by the linear alkylene structural unit among all monomer units included in the polymer B) is preferably 25 mass % or more, and more preferably 30 mass % or more, and is preferably 70 mass % or less, and more preferably 60 mass % or less. When the content of the linear alkylene structural unit in the polymer B is not less than any of the lower limits set forth above, a functional layer can be provided with good flexibility. On the other hand, when the content of the linear alkylene structural unit in the polymer B is not more than any of the upper limits set forth above, a functional layer can be provided with good adhesiveness.

Note that the content of the linear alkylene structural unit in the polymer B (i.e., the proportion constituted by the linear alkylene structural unit among all monomer units included in the polymer B) can be measured by a nuclear magnetic resonance (NMR) method such as $^1$H-NMR.

[Other Monomer Units]

The polymer B may include other monomer units besides the aliphatic conjugated diene monomer unit and the linear alkylene structural unit. Examples of monomer units other than the aliphatic conjugated diene monomer unit and the linear alkylene structural unit include, but are not specifically limited to, an aromatic-containing monomer unit, an acid group-containing monomer unit, a hydroxyl group-containing monomer unit, a (meth)acrylic acid ester monomer unit, a nitrile group-containing monomer unit, and a cross-linkable monomer unit. Examples of monomers that can form the acid group-containing monomer unit, the hydroxyl group-containing monomer unit, and the (meth)acrylic acid ester monomer unit include the various compounds given as examples in the "Other monomer units" section in relation to the polymer A.

Moreover, specific examples of nitrile group-containing monomers that can form the nitrile group-containing monomer unit include acrylonitrile, methacrylonitrile, and α-chloroacrylonitrile, with acrylonitrile being preferable.

Examples of cross-linkable monomers that can form the cross-linkable monomer unit include reactive monomers that include an olefinic double bond per molecule and a reactive group selected from an epoxy group, an N-methylolamide group, an oxetanyl group, an oxazoline group and a cross-linkable group, and polyfunctional monomers that include an olefinic double bond per molecule. Examples of reactive monomers that include a reactive group include (meth)acrylamides that include a methylol group, such as N-methylol (meth)acrylamide, and combinations thereof. Note that in a case in which the polymer B includes an amide group-containing monomer unit, the content of the amide group-containing monomer unit in the polymer B is preferably less than 10 mass % or more than 90 mass %. Moreover, in a case in which the polymer B includes an epoxy group-containing monomer unit, the content of the epoxy group-containing monomer unit in the polymer B is preferably less than 0.1 mass % or more than 50 mass %.

Examples of polyfunctional monomers that include an olefinic double bond include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, and trimethylolpropane diallyl ether.

The polymer B is preferably a polymer that includes an aliphatic conjugated diene monomer unit and an aromatic vinyl monomer unit, and is more preferably a polymer that includes an aliphatic conjugated diene monomer unit, an aromatic vinyl monomer unit, and an ethylenically unsaturated carboxylic acid monomer unit. Note that one type of other monomer unit may be used individually, or two or more types of other monomer units may be used in combination in a freely selected ratio.

[[Aromatic-Containing Monomer Unit]]

Examples of aromatic-containing monomers that can form the aromatic-containing monomer unit include, but are not specifically limited to, aromatic vinyl monomers such as styrene, styrene sulfonic acid and salts thereof, α-methylstyrene, butoxystyrene and vinylnaphthalene. Of these aromatic-containing monomers, styrene is preferable from a viewpoint of adhesiveness and flexibility of a functional layer. Note that one aromatic-containing monomer may be used individually, or two or more aromatic-containing monomers may be used in combination in a freely selected ratio.

The content of monomer units other than the aromatic-containing monomer unit in the polymer B (i.e., the proportion constituted by other monomer units among all monomer units included in the polymer B) is preferably 0.1 mass % or more, and more preferably 0.5 mass % or more, and is preferably 10 mass % or less, and more preferably 5 mass % or less. When the content of monomer units other than the aromatic-containing monomer unit in the polymer B is not less than any of the lower limits set forth above, polymerization stability and slurry stability can be imparted. On the other hand, when the content of other monomer units in the polymer B is not more than any of the upper limits set forth above, good electrode close adherence and flexibility can be achieved.

Note that the content of other monomer units in the polymer B (i.e., the proportion constituted by other monomer units among all monomer units included in the polymer B) can be measured by a nuclear magnetic resonance (NMR) method such as $^1$H-NMR.

<Mass of Polymer A as Proportion Relative to Total of Mass of Polymer A and Mass of Polymer B (Mass of Polymer A/Total of Mass of Polymer A and Mass of Polymer B)>

The mass of the polymer A as a proportion relative to the total of the mass of the polymer A and the mass of the polymer B (mass of polymer A/total of mass of polymer A and mass of polymer B) is preferably 10 mass % or more, and more preferably 15 mass % or more, and is preferably 90 mass % or less, and more preferably 85 mass % or less. Slurry stability can be imparted when this proportion is not less than any of the lower limits set forth above. On the other hand, a functional layer can be provided with binding capacity when this proportion is not more than any of the upper limits set forth above.

<Other Components>

Besides the components described above, the presently disclosed binder composition for an electrochemical device may contain components such as reinforcing materials, leveling agents, viscosity modifiers, and additives for electrolyte solution. These other components are not specifically limited so long as they do not affect battery reactions and may be selected from commonly known components such as those described in WO2012/115096A1, for example. Moreover, the presently disclosed binder composition for an electrochemical device may contain a small amount of an organic solvent such as N-methylpyrrolidone (NMP). Note that one of these components may be used individually, or two or more of these components may be used in combination in a freely selected ratio.

<Production Method of Binder Composition for Electrochemical Device>

The method by which the presently disclosed binder composition for an electrochemical device is produced is not specifically limited. For example, in a case in which the polymer A, which is a water-dispersible polymer or a water-soluble polymer, is produced in an aqueous medium to obtain a water dispersion or an aqueous solution of the polymer A, the water dispersion or aqueous solution of the polymer A may be used in that form as the binder composition for an electrochemical device, or the binder composition for an electrochemical device may be obtained by adding the optional polymer B and/or other components to the water dispersion or aqueous solution of the polymer A.

(Slurry Composition for Electrochemical Device)

The presently disclosed slurry composition for an electrochemical device is a slurry composition for an electrochemical device having water as a dispersion medium that contains at least a binder composition for an electrochemical device containing the previously described polymer A, water, and the optional polymer B and/or other components, and that optionally contains functional particles (electrode active material or non-conductive particles) and other components.

Note that in a case in which the presently disclosed slurry composition for an electrochemical device contains an electrode active material, a functional layer that is formed using the presently disclosed slurry composition for an electrochemical device can function well as an electrode mixed material layer having excellent peel strength.

Moreover, in a case in which the presently disclosed slurry composition for an electrochemical device contains non-conductive particles, a functional layer that is formed using the presently disclosed slurry composition for an electrochemical device can function well as a porous membrane layer having excellent heat resistance and strength.

<Mass of Polymer A as Proportion Relative to Mass of all Solid Content in Slurry Composition (Mass of Polymer A/Mass of all Solid Content in Slurry Composition)>

The mass of the polymer A as a proportion relative to the mass of all solid content in the slurry composition (mass of polymer A/mass of all solid content in slurry composition) is preferably 0.2 mass % or more, and more preferably 0.5 mass % or more, and is preferably 3.0 mass % or less, and more preferably 2.5 mass % or less. When this proportion is not less than any of the lower limits set forth above, the slurry composition can be provided with excellent stability and coatability. On the other hand, when this proportion is not more than any of the upper limits set forth above, a functional layer can be provided with flexibility.

<Mass of Polymer B as Proportion Relative to Mass of all Solid Content in Slurry Composition (Mass of Polymer B/Mass of all Solid Content in Slurry Composition)>

The mass of the polymer B as a proportion relative to the mass of all solid content in the slurry composition (mass of polymer B/mass of all solid content in slurry composition) is preferably 0.2 mass % or more, and more preferably 0.4 mass % or more, and is preferably 7.0 mass % or less, and more preferably 6.0 mass % or less. When this proportion is not less than any of the lower limits set forth above, a functional layer can be provided with excellent adhesiveness. On the other hand, when this proportion is not more than any of the upper limits set forth above, a functional layer for an electrochemical device can be provided with excellent heat resistance, and a rise in battery resistance can be inhibited.

<Functional Particles>

Examples of functional particles for causing a functional layer to display an expected function include electrode active material particles formed of an electrode active material in a case in which the functional layer is an electrode mixed material layer and non-conductive particles in a case in which the functional layer is a porous membrane layer.

[Electrode Active Material]

An electrode active material is a material that, in a case in which the electrochemical device is a lithium ion secondary battery, for example, gives and receives electrons in an electrode (positive electrode or negative electrode) of the lithium ion secondary battery. An electrode active material (positive electrode active material or negative electrode active material) of a lithium ion secondary battery (i.e., an electrochemical device) is normally a material that can occlude and release lithium.

[[Positive Electrode Active Material]]

Specifically, the positive electrode active material can be a compound that contains a transition metal, such as a transition metal oxide, a transition metal sulfide, or a complex metal oxide of lithium and a transition metal, for example. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the complex metal oxide of lithium and a transition metal include a lithium-containing complex metal oxide having a layered structure, a lithium-containing complex metal oxide having a spinel structure, and a lithium-containing complex metal oxide having an olivine structure.

The lithium-containing complex metal oxide having a layered structure may be lithium-containing cobalt oxide ($LiCoO_2$), lithium-containing nickel oxide ($LiNiO_2$), a lithium-containing complex oxide of Co—Ni—Mn (Li$(CoMnNi)O_2$), a lithium-containing complex oxide of Ni—Mn—Al, a lithium-containing complex oxide of Ni—Co—Al, a solid solution of $LiMaO_2$ and $Li_2MbO_3$, or the like, for example. Note that the lithium-containing complex oxide of Co—Ni—Mn may be $Li[Ni_{0.5}Co_{0.2}Mn_{0.3}]O_2$, $Li[Ni_{1/3}Co_{1/3}Mn_{1/3}]O_2$, or the like. Moreover, the solid solution of $LiMaO_2$ and $Li_2MbO_3$ may be $xLiMaO_2 \cdot (1-x)Li_2MbO_3$ or the like. Note that x represents a number satisfying $0<x<1$, Ma represents one or more types of transition metals having an average oxidation state of 3+, and Mb represents one or more types of transition metals having an average oxidation state of 4+. Examples of such solid solutions include $Li[Ni_{0.17}Li_{0.2}Co_{0.07}Mn_{0.56}]O_2$.

The term "average oxidation state" as used herein refers to an average oxidation state of the "one or more types of transition metals" and is calculated from the molar quantities and the valences of the transition metals. For example, in a case in which the "one or more types of transition metals" is made up of 50 mol % of $Ni^{2+}$ and 50 mol % of $Mn^{4+}$, the average oxidation state of the "one or more types of transition metals" is $(0.5)\times(2+)+(0.5)\times(4+)=3+$.

The lithium-containing complex metal oxide having a spinel structure may be lithium manganate ($LiMn_2O_4$) or a compound in which some of the Mn in lithium manganate ($LiMn_2O_4$) is replaced by another transition metal, for example. Specific examples include $Li_s[Mn_{2-t}Mc_t]O_4$ such as $LiNi_{0.5}Mn_{1.5}O_4$. Note that Mc represents one or more types of transition metals having an average oxidation state of 4+. Specific examples of Mc include Ni, Co, Fe, Cu, and Cr. Moreover, t represents a number satisfying $0<t<1$, and s represents a number satisfying $0\leq s\leq 1$. Also note that a lithium-rich spinel compound represented by $Li_{1+x}Mn_{2-x}O_4$ (0<x<2) or the like can be used as the positive electrode active material.

The lithium-containing complex metal oxide having an olivine structure may be an olivine-type lithium phosphate compound represented by $Li_yMdPO_4$ such as olivine-type lithium iron phosphate ($LiFePO_4$) or olivine-type lithium manganese phosphate ($LiMnPO_4$), for example. Note that Md represents one or more types of transition metals having an average oxidation state of 3+, examples of which include Mn, Fe, and Co. Moreover, y represents a number satisfying $0 \leq y \leq 2$. Furthermore, Md in the olivine-type lithium phosphate compound represented by $Li_yMdPO_4$ may be partly replaced by another metal. The replacing metal may be Cu, Mg, Zn, V, Ca, Sr, Ba, Ti, Al, Si, B, Mo, or the like, for example.

[[Negative Electrode Active Material]]

The negative electrode active material may be a carbon-based negative electrode active material, a metal-based negative electrode active material, or a negative electrode active material that is a combination thereof, for example.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of carbonaceous materials include graphitizing carbon whose carbon structure can easily be changed according to the heat treatment temperature and non-graphitizing carbon having a structure similar to an amorphous structure, which is typified by glassy carbon.

The graphitizing carbon may be a carbon material made using tar pitch obtained from petroleum or coal as a raw material. Specific examples include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of artificial graphite include artificial graphite obtained through heat treatment of carbon containing graphitizing carbon mainly at 2800° C. or higher, graphitized MCMB obtained through heat treatment of MCMB at 2000° C. or higher, and graphitized mesophase pitch-based carbon fiber obtained through heat treatment of mesophase pitch-based carbon fiber at 2000° C. or higher.

The metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based active material include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti) and alloys thereof, and oxides, sulfides, nitrides, silicides, carbides, and phosphides of any of the preceding examples. Of these metal-based negative electrode active materials, active materials containing silicon (silicon-based negative electrode active materials) are preferred. One reason for this is that the capacity of a lithium ion secondary battery (i.e., an electrochemical device) can be increased by using a silicon-based negative electrode active material.

Examples of silicon-based negative electrode active materials include silicon (Si), a silicon-containing alloy, SiO, $SiO_x$, and a composite of conductive carbon and a Si-containing material obtained by coating or combining the Si-containing material with the conductive carbon. Note that one of these silicon-based negative electrode active materials may be used individually, or two or more of these silicon-based negative electrode active materials may be used in combination.

The silicon-containing alloy may be, for example, an alloy composition that contains silicon, aluminum, and transition metals such as iron, and further contains rare-earth elements such as tin and yttrium.

$SiO_x$ is a compound containing Si and at least one of SiO and $SiO_2$, where x is normally not less than 0.01 and less than 2. $SiO_x$ can be formed by utilizing a disproportionation reaction of silicon monoxide (SiO), for example. Specifically, $SiO_x$ can be prepared by heat-treating SiO, optionally in the presence of a polymer such as polyvinyl alcohol, to produce silicon and silicon dioxide. After SiO has optionally been pulverized and mixed with the polymer, the heat treatment can be performed at a temperature of 900° C. or higher, and preferably 1000° C. or higher, in an atmosphere containing organic gas and/or vapor.

The composite of a Si-containing material and conductive carbon may, for example, be a compound obtained by heat-treating a pulverized mixture of SiO, a polymer such as polyvinyl alcohol, and optionally a carbon material in an atmosphere containing organic gas and/or vapor, for example. Alternatively, the composite can be obtained by a commonly known method such as a method in which particles of SiO are surface coated by chemical vapor deposition using an organic gas or the like or a method in which composite particles are formed from SiO particles and graphite or artificial graphite by a mechanochemical method (granulation).

[Mass of Electrode Active Material as Proportion Relative to Mass of all Solid Content in Slurry Composition (Mass of Electrode Active Material/Mass of all Solid Content in Slurry Composition)]

The mass of the electrode active material as a proportion relative to the mass of all solid content in the slurry composition (mass of electrode active material/mass of all solid content in slurry composition) is preferably 92.0 mass % or more, and more preferably 95.0 mass % or more, and is preferably 99.6 mass % or less, and more preferably 98.5 mass % or less. A higher capacity can be achieved when this proportion is not less than any of the lower limits set forth above.

[Non-Conductive Particles]

In a case in which the electrochemical device is a lithium ion secondary battery, for example, the non-conductive particles are particles that maintain their shape without dissolving in water or a non-aqueous electrolyte solution of the secondary battery (i.e., the electrochemical device). The non-conductive particles are electrochemically stable and are, therefore, present stably in a functional layer in the environment of use of the secondary battery (i.e., the electrochemical device).

Various types of inorganic fine particles and organic fine particles can be used as the non-conductive particles, for example.

Specifically, although both inorganic fine particles and organic fine particles can be used as the non-conductive particles, inorganic fine particles are normally used. In particular, the material of the non-conductive particles is preferably an electrochemically stable material that is present stably in the environment of use of the secondary battery (i.e., the electrochemical device). Examples of materials that are preferable for the non-conductive particles from a viewpoint such as described above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination. The non-conductive particles are preferably aluminum oxide (alumina). The particle diameter of the non-conductive particles is not specifically limited and can be the same as that of conventionally used non-conductive particles.

[Mass of Non-Conductive Particles as Proportion Relative to Mass of all Solid Content in Slurry Composition (Mass of Non-Conductive Particles/Mass of all Solid Content in Slurry Composition)]

The mass of the non-conductive particles as a proportion relative to the mass of all solid content in the slurry composition (mass of non-conductive particles/mass of all solid content in slurry composition) is preferably 80 mass % or more, and more preferably 85 mass % or more, and is preferably 99 mass % or less, and more preferably 98 mass % or less. When this proportion is not less than any of the lower limits set forth above, a functional layer can be provided with excellent heat resistance. On the other hand, when this proportion is not more than any of the upper limits set forth above, a functional layer can be provided with good adhesiveness.

<Other Components>

The slurry composition for an electrochemical device may contain other optional components besides the components described above. No specific limitations are placed on these optional components so long as they do not have an excessively negative influence on electrochemical reactions in an electrochemical device in which a functional layer is used. Furthermore, one of such optional components may be used, or two or more of such optional components may be used.

Examples of optional components that can be used include wetting agents, particulate binders, leveling agents, and electrolyte solution decomposition inhibitors.

[Wetting Agent]

A nonionic surfactant or an anionic surfactant can be used as a wetting agent without any specific limitations. Of these wetting agents, aliphatic polyether nonionic surfactants are preferable.

The amount of the wetting agent that is used per 100 parts by mass of the functional particles is preferably 0.05 parts by mass or more, more preferably 0.1 parts by mass or more, and particularly preferably 0.15 parts by mass or more, and is preferably 2 parts by mass or less, more preferably 1.5 parts by mass or less, and particularly preferably 1 part by mass or less. When the amount of the wetting agent that is used is within any of the ranges set forth above, coatability of the slurry composition can be sufficiently improved, and low-temperature output characteristics of a secondary battery including a functional layer that is formed using the slurry composition can be sufficiently improved.

<Production of Slurry Composition for Electrochemical Device>

The slurry composition for an electrochemical device set forth above can be produced by dispersing the components described above in an aqueous medium serving as a dispersion medium.

For example, in a case in which the slurry composition is a slurry composition for an electrode mixed material layer, the slurry composition can be produced through mixing of the binder composition, the electrode active material particles, and the other components that are used as necessary, performed in the presence of an aqueous medium.

Moreover, in a case in which the slurry composition is a slurry composition for a porous membrane layer, the slurry composition can be produced through mixing of the binder composition, the non-conductive particles, and the other components that are used as necessary, performed in the presence of an aqueous medium.

Furthermore, in a case in which the slurry composition is a slurry composition for an adhesive layer, the binder composition can be used in that form as the slurry composition or can be used as the slurry composition after being diluted with an aqueous medium. Alternatively, the slurry composition can be produced through mixing of the binder composition and other components that are used as necessary, performed in the presence of an aqueous medium.

The method of mixing is not specifically limited and may be through mixing performed using a typically used stirrer or disperser. Specifically, the slurry composition for an electrochemical device can be produced using a mixer such as a ball mill, a sand mill, a bead mill, a pigment disperser, a grinding machine, an ultrasonic disperser, a homogenizer, a planetary mixer, or a FILMIX. A high-level dispersing device such as a bead mill, a roll mill, or a FILMIX may be used from a viewpoint of imparting high dispersing shear. Mixing of the above-described components and the aqueous medium may normally be performed for a period of from 10 minutes to several hours in a temperature range of from room temperature to 80° C.

Water is typically used as the aqueous medium but, alternatively, an aqueous solution of any compound or a mixed solution of water and a small amount of an organic medium may be used. Note that water used as the aqueous medium may include water that was contained in the binder composition.

(Functional Layer for Electrochemical Device)

The functional layer for an electrochemical device is a layer having a function such as giving and receiving electrons, reinforcement, or adhesion inside an electrochemical device and may, for example, be an electrode mixed material layer that gives and receives electrons through electrochemical reactions, a porous membrane layer that improves heat resistance and strength of a battery member, or an adhesive layer that improves adhesiveness of a battery member. Of these examples, the presently disclosed functional layer for an electrochemical device is preferably an electrode mixed material layer, and more preferably a negative electrode mixed material layer.

The presently disclosed functional layer for an electrochemical device is a layer that is formed from the slurry composition for an electrochemical device set forth above and can be formed by, for example, applying the slurry composition for an electrochemical device set forth above onto the surface of a suitable substrate to form a coating film, and then drying the coating film that is formed. In other words, the presently disclosed functional layer for an electrochemical device is formed of a dried product of the slurry composition for an electrochemical device set forth above, normally contains the previously described polymer A, and optionally further contains the previously described polymer B, the previously described functional particles, and the previously described other components.

Note that the ratio in which each component (excluding a dispersion medium such as water) is contained in the presently disclosed functional layer for an electrochemical device is normally the same as the ratio in which that component is contained in the slurry composition for an electrochemical device set forth above. Moreover, the preferred ratio of each component in the functional layer for an electrochemical device is the same as the preferred ratio of that component in the slurry composition for an electrochemical device set forth above.

The presently disclosed functional layer for an electrochemical device can function well as an electrode mixed material layer, a porous membrane layer, or an adhesive layer as a result of being formed from the presently disclosed slurry composition for an electrochemical device. In addition, the presently disclosed functional layer for an electrochemical device can enhance cycle characteristics and the like of an electrochemical device.

<Substrate>

No specific limitations are placed on the substrate on which the functional layer for an electrochemical device is formed. For example, in a case in which the functional layer is used as a member that constitutes part of a separator, a separator substrate can be used as the substrate. Moreover, in a case in which the functional layer is used as a member that constitutes part of an electrode, a current collector substrate comprising a current collector or an electrode substrate obtained by forming an electrode mixed material layer on a current collector can be used as the substrate. No specific limitations are placed on how the functional layer formed on the substrate is used. For example, the functional layer may be formed on a separator substrate or the like and the resultant product may be used in that form as a battery member such as a separator. Moreover, an electrode mixed material layer may be formed as the functional layer on a current collector substrate and the resultant product may be used as an electrode, or the functional layer may be formed on an electrode substrate and the resultant product may be used as an electrode. Furthermore, a functional layer that is formed on a releasable substrate may be peeled from the substrate, the functional layer may be affixed to another substrate, and the resultant product may be used as a battery member.

However, it is preferable that a separator substrate, a current collector substrate, or an electrode substrate is used as the substrate from a viewpoint of increasing battery member production efficiency since a step of peeling a releasable substrate from the functional layer can be omitted.

[Separator Substrate]

The separator substrate may be a known separator substrate such as an organic separator substrate without any specific limitations. An organic separator substrate is a porous member that is formed of an organic material, and examples thereof include a microporous membrane containing a polyolefin resin such as polyethylene or polypropylene, an aromatic polyamide resin, or the like. In particular, a microporous membrane made from polyethylene is preferable due to the excellent strength thereof. Although the organic separator substrate may be of any thickness, the thickness thereof is normally 0.5 μm or more, and preferably 5 μm or more, and is normally 40 μm or less, preferably 30 μm or less, and more preferably 20 μm or less.

[Current Collector Substrate]

A known current collector can be used as the current collector substrate without any specific limitations.

The current collector is a material having electrical conductivity and electrochemical durability. Specifically, the current collector may, for example, be made of a metal material such as iron, copper, aluminum, nickel, stainless steel, titanium, tantalum, gold, or platinum. One of these materials may be used individually, or two or more of these materials may be used in combination in a freely selected ratio.

[Electrode Substrate]

The electrode substrate (positive/negative electrode substrate) is not specifically limited and may, for example, be an electrode substrate obtained by forming an electrode mixed material layer on a current collector.

Note that the current collector, an electrode active material (positive/negative electrode active material) and a binder for an electrode mixed material layer (binder for a positive/negative electrode mixed material layer) that are contained in the electrode mixed material layer, and the method by which the electrode mixed material layer is formed on the current collector can be known examples thereof such as any of those described in JP2013-145763A, for example. Moreover, the polymer A that is contained in the presently disclosed binder composition for an electrochemical device may be used as the binder for an electrode mixed material layer.

[Releasable Substrate]

A known releasable substrate can be used without any specific limitations as a releasable substrate on which the functional layer is formed.

<Formation Method of Functional Layer for Electrochemical Device>

Examples of methods by which the functional layer may be formed on a substrate such as the separator substrate, current collector substrate, or electrode substrate described above include:

(1) a method in which the slurry composition for an electrochemical device is applied onto the surface of the separator substrate, current collector substrate, or electrode substrate, and is then dried;

(2) a method in which the separator substrate, current collector substrate, or electrode substrate is immersed in the slurry composition for an electrochemical device, and is then dried; and (3) a method in which the slurry composition for an electrochemical device is applied onto a releasable substrate and is dried to produce a functional layer, and then the obtained functional layer for an electrochemical device is transferred onto the surface of the separator substrate, current collector substrate, or electrode substrate.

Of these methods, method (1) is particularly preferable since it allows simple control of the thickness of the functional layer for an electrochemical device. In more detail, method (1) includes a step of applying the slurry composition for an electrochemical device onto the separator substrate, current collector substrate, or electrode substrate (application step) and a step of drying the slurry composition for an electrochemical device that has been applied onto the separator substrate, current collector substrate, or electrode substrate to form a functional layer (functional layer formation step).

[Application Step]

The method by which the slurry composition for an electrochemical device is applied onto the substrate in the application step is not specifically limited and may be a method such as doctor blading, reverse roll coating, direct roll coating, gravure coating, extrusion coating, or brush coating, for example.

[Functional Layer Formation Step]

The slurry composition for an electrochemical device on the substrate can be dried by any commonly known method without any specific limitations in the functional layer formation step. For example, the drying method may be drying by warm, hot, or low-humidity air; drying in a vacuum; or drying by irradiation with infrared light, electron beams, or the like. Although no specific limitations are placed on the drying conditions, the drying temperature is preferably 50° C. to 100° C., and the drying time is preferably 5 minutes to 30 minutes. The thickness of the functional layer for an electrochemical device that is formed on the substrate can be adjusted as appropriate.

Note that in a case in which the functional layer is an electrode mixed material layer, the electrode mixed material layer may be subjected to pressing treatment (pressing process) by mold pressing, roll pressing, or the like after the drying step. The pressing process can improve close adherence between the electrode mixed material layer and the current collector. Moreover, a denser electrode mixed material layer and a more compact secondary battery can be obtained as a result.

(Electrochemical Device)

The presently disclosed electrochemical device may, without any specific limitations, be a lithium ion secondary battery or an electric double-layer capacitor, and is preferably a lithium ion secondary battery. A feature of the presently disclosed electrochemical device is that it includes the presently disclosed functional layer for an electrochemical device. Such an electrochemical device has excellent characteristics such as cycle characteristics.

Although the following describes, as one example, a case in which the electrochemical device is a lithium ion secondary battery, the presently disclosed electrochemical device is not limited to the following example. A lithium ion secondary battery corresponding to the presently disclosed electrochemical device normally includes electrodes (positive electrode and negative electrode), an electrolyte solution, and a separator, and has the presently disclosed functional layer for an electrochemical device used in at least one of the positive electrode, the negative electrode, and the separator.

<Positive Electrode, Negative Electrode, and Separator>

At least one of the positive electrode, the negative electrode, and the separator used in the lithium ion secondary battery corresponding to the presently disclosed electrochemical device includes the presently disclosed functional layer for an electrochemical device. Specifically, in the case of a positive electrode or a negative electrode that includes the functional layer for an electrochemical device, it is possible to use an electrode that is obtained by forming an electrode mixed material layer as the functional layer on a current collector (substrate) or an electrode that is obtained by further providing the functional layer on an electrode substrate including an electrode mixed material layer formed on a current collector. Moreover, in the case of a separator that includes the functional layer for an electrochemical device, it is possible to use a separator that is obtained by providing the functional layer for an electrochemical device on a separator substrate. The current collector substrate, the electrode substrate, and the separator substrate can be any of those described in the "Substrate" section.

<Positive Electrode and Negative Electrode>

So long as at least one of the positive electrode, the negative electrode, and the separator used in the lithium ion secondary battery corresponding to the presently disclosed electrochemical device includes the presently disclosed functional layer for an electrochemical device as previously described, the negative electrode may be a known negative electrode, the positive electrode may be a known positive electrode, or both the positive electrode and the negative electrode of the secondary battery may be known electrodes.

[Separator]

The separator can be a separator such as described in JP2012-204303A, for example, so long as at least one of the positive electrode and the negative electrode used in the lithium ion secondary battery corresponding to the presently disclosed electrochemical device includes the presently disclosed functional layer for an electrochemical device. Of these separators, a microporous membrane made of polyolefinic resin (polyethylene, polypropylene, polybutene, or polyvinyl chloride) is preferred since such a membrane can reduce the total thickness of the separator, which increases the ratio of electrode active material in the lithium ion secondary battery corresponding to the presently disclosed electrochemical device, and consequently increases the volumetric capacity of the lithium ion secondary battery corresponding to the presently disclosed electrochemical device.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), methyl ethyl carbonate (ethyl methyl carbonate (EMC)), and vinylene carbonate; esters such as γ-butyrolactone and methyl formate; ethers such as 1,2-dimethoxyethane and tetrahydrofuran; and sulfur-containing compounds such as sulfolane and dimethyl sulfoxide.

Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Electrochemical Device>

The lithium ion secondary battery corresponding to the presently disclosed electrochemical device can be produced by, for example, stacking the positive electrode and the negative electrode with the separator in-between, performing rolling, folding, or the like of the resultant laminate, as necessary, to place the laminate in a battery container, injecting the electrolyte solution into the battery container, and sealing the battery container. Note that at least one member among the positive electrode, the negative electrode, and the separator is a member that includes the presently disclosed functional layer for an electrochemical device. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like, for example.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a repeating unit (monomer unit) that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate (i) the weight-average molecular weight of a polymer A, (ii) the slurry dispersibility of a slurry composition, (iii) the coatability (thixotropy) of a slurry composition, (iv) the electrolyte solution penetrability (electrolyte solution wettability) of an electrode (negative electrode), and (v) the cycle characteristics of a secondary battery.

<(i) Weight-Average Molecular Weight of Polymer A>

The weight-average molecular weight of a polymer A was measured by gel permeation chromatography (GPC). First, the polymer A was added to approximately 5 mL of eluent such that the solid content concentration thereof was approximately 0.5 g/L and was slowly dissolved at room temperature. Once dissolution of the polymer A was visually confirmed, the solution was gently filtered through a 0.45 μm filter to produce a measurement sample. The weight-average molecular weight was then calculated as a standard substance-equivalent value by preparing a calibration curve using a standard substance.

Note that the measurement conditions were as follows.

<<Measurement Conditions>>

Column: Shodex OHpak (SB-G, SB-807HQ, SB-806MHQ) (product name) produced by Showa Denko K.K.

Eluent: 0.1 M Tris buffer solution (0.1 M of potassium chloride added)

Flow rate: 0.5 mL/min

Sample concentration: 0.05 g/L (solid content concentration)

Injection volume: 200 μL

Column temperature: 40° C.

Detector: Differential refractive index detector RI (produced by Tosoh Corporation; product name: RI-8020)

Standard substance: Monodisperse pullulan (produced by Showa Denko K.K.)

<(ii) Slurry Dispersibility of Slurry Composition>

A produced slurry composition was stored at a temperature of 25° C. for 5 days under stirring (stirring speed: 60 rpm) by a mix rotor. The viscosity ηini of the slurry composition straight after production thereof and the viscosity η5d of the slurry composition after being stored for 5 days were used to calculate the rate of viscosity change (=(η5d/ηini)×100%). Note that the viscosities (25° C.) were measured using a B-type viscometer The slurry dispersibility of the slurry composition was evaluated by the following standard. A smaller viscosity change indicates better dispersibility of an electrode active material and the like contained in the slurry composition.

A: Rate of viscosity change of not less than 90% and not more than 110%

B: Rate of viscosity change of not less than 80% and less than 90% or of more than 110% and not more than 120%

C: Rate of viscosity change of not less than 70% and less than 80% or of more than 120% and not more than 130%

D: Rate of viscosity change of less than 70% or more than 130%

<(iii) Coatability (Thixotropy) of Slurry Composition>

A B-type viscometer was used to measure the viscosity (η6) of a produced slurry composition at 6 rpm and the viscosity (η60) of the slurry composition at 60 rpm under room temperature (25° C.).

A viscosity ratio (TI value) was calculated as η6/η160, and then coatability (thixotropy) of the slurry composition was evaluated by the following standard. A larger TI value indicates better coatability.

A: TI value of 3.0 or more

B: TI value of less than 3.0 and not less than 2.8

C: TI value of less than 2.8 and not less than 2.6

D: TI value of less than 2.6

<(iv) Electrolyte Solution Penetrability (Electrolyte Solution Wettability) of Electrode (Negative Electrode)>

The electrolyte solution penetrability of an electrode (negative electrode) obtained in each example or comparative example was evaluated as follows.

First, the obtained electrode (negative electrode) was affixed to sheet glass using double-sided tape, and then the electrode and the affixed sheet glass were placed horizontally inside a glovebox. Electrolyte solution was dripped onto the electrode, and the time taken from straight after dripping until the glossiness of the droplet disappeared was measured. The measured time was used to calculate an index value with the time in Comparative Example 1, described further below, taken to be 100. A smaller value indicates better electrolyte solution penetrability and higher productivity.

A: Less than 35
B: Not less than 35 and less than 55
C: Not less than 55 and less than 75
D: 75 or more <(v) Cycle Characteristics of Secondary Battery>

Each produced lithium ion secondary battery was subjected to charge/discharge cycling of charging to 4.2 V with a 0.2 C constant current and discharging to 3.0 V with a 0.2 C constant current in a 60° C. environment. This charge/discharge cycling was repeated for 200 cycles, and a ratio of the electric capacity at the end of 200 cycles relative to the electric capacity at the end of 5 cycles was calculated as a percentage. This measurement was performed 10 times using different cells and the average value of the calculated percentages was determined as the capacity maintenance rate. The capacity maintenance rate was evaluated by the following standard. A larger capacity maintenance rate indicates a smaller decrease of capacity through repeated charging and discharging and better high-temperature cycle characteristics.

A: Capacity maintenance rate of 85% or more
B: Capacity maintenance rate of not less than 80% and less than 85%
C: Capacity maintenance rate of not less than 70% and less than 80%
D: Capacity maintenance rate of less than 70%

Example 1

<Production of Polymer A>

A flask including a condenser and a stirrer was charged with 5 parts by mass of 2,2'-azobis(2-(2-imidazolin-2-yl)propane) disulfate dihydrate and 789 parts by mass of deionized water. Next, 5 parts of glycidyl methacrylate (GMA) as an epoxy group-containing monomer, 70 parts of acrylamide (AAmid) as an amide group-containing monomer, and 25 parts of acrylic acid (AA) as another monomer were mixed, and were then added into the flask. The flask was purged with nitrogen and was slowly stirred while increasing the temperature of the solution to 70° C. and then holding the temperature at 70° C. for 5 hours to carry out polymerization and thereby yield a solution containing a polymer A. The weight-average molecular weight of the obtained polymer A was measured by the previously described method. The result is shown in Table 1.

<Production of Polymer B (Semi-Batch Polymerization)>

A 5 MPa pressure vessel A equipped with a stirrer was charged with 3.0 parts of styrene as another monomer, 1.66 parts of 1,3-butadiene as an aliphatic conjugated diene monomer, 0.19 parts of itaconic acid as another monomer, 0.2 parts of sodium lauryl sulfate as an emulsifier, 20 parts of deionized water, and 0.03 parts of potassium persulfate as a polymerization initiator. These materials were sufficiently stirred and were then heated to 60° C. to initiate a first stage of polymerization and carry out a reaction for 6 hours to obtain seed particles.

After this reaction, the temperature of the pressure vessel A was raised to 75° C., addition of a mixture of 59.0 parts of styrene as another monomer, 31.34 parts of 1,3-butadiene as an aliphatic conjugated diene monomer, 3.81 parts of itaconic acid as another monomer, 0.25 parts of tert-dodecyl mercaptan as a chain transfer agent, and 0.35 parts of sodium lauryl sulfate as an emulsifier from a separate vessel B to the pressure vessel A was initiated, and, simultaneously thereto, addition of 1 part of potassium persulfate as a polymerization initiator to the pressure vessel A was initiated so as to initiate a second stage of polymerization.

Once 4 hours had passed from the start of the second stage of polymerization (after 70% of the overall monomer composition had been added), 1 part of 2-hydroxyethyl acrylate as another monomer was added into the pressure vessel A over 1.5 hours.

In other words, 62.0 parts of styrene as another monomer, 33.0 parts of 1,3-butadiene as an aliphatic conjugated diene monomer, 4.0 parts of itaconic acid as another monomer, and 1.0 parts of 2-hydroxyethyl acrylate as another monomer were used as the overall monomer composition.

Once 5.5 hours had passed from the start of the second stage of polymerization, addition of the total amount of a mixture containing these monomer compositions was completed, and then the reaction was continued for a further 6 hours under heating to 85° C.

Cooling was performed to quench the reaction at the point at which the polymerization conversion rate reached 97%. The mixture containing the polymerized product was adjusted to pH 8 through addition of 5% sodium hydroxide aqueous solution. Unreacted monomer was subsequently removed by thermal-vacuum distillation. Cooling was then performed to obtain a polymer B.

<Production of Slurry Composition for Electrochemical Device (Slurry Composition for Negative Electrode)>

A planetary mixer equipped with a disper blade was charged with 97.0 parts of artificial graphite (volume-average particle diameter: 24.5 μm) having a specific surface area of 4 m²/g as an electrode active material and 1.50 parts in terms of solid content of the polymer A. These materials were adjusted to a solid content concentration of 55% with deionized water and were mixed at room temperature for 60 minutes. Thereafter, these materials were adjusted to a solid content concentration of 50% with deionized water and were further mixed for 15 minutes to obtain a mixture.

The mixture was mixed for 10 minutes with 1.5 parts of the polymer B (in terms of solid content). The resultant mixture was subjected to a defoaming process under reduced pressure to yield a slurry composition for an electrochemical device having good fluidity. The slurry dispersibility of the obtained slurry composition for an electrochemical device was evaluated by the previously described method. Moreover, the obtained slurry composition for an electrochemical device was used to evaluate the coatability (thixotropy) of the slurry composition for an electrochemical device. The results are shown in Table 1.

<Production of Negative Electrode>

The slurry composition for an electrochemical device (slurry composition for a negative electrode) described above was applied onto copper foil (current collector) of 18 μm in thickness by a comma coater such as to have a thickness after drying of approximately 150 μm. The copper foil with the slurry composition for an electrochemical device applied thereon was conveyed inside a 75° C. oven for 2 minutes and inside a 120° C. oven for 2 minutes at a speed of 0.5 m/min in order to dry the slurry composition on the copper foil and thereby obtain a negative electrode web. The negative electrode web was rolled by roll pressing to obtain a negative electrode having a negative electrode mixed material layer thickness of 80 μm.

The electrolyte solution penetrability (electrolyte solution wettability) of the obtained negative electrode was evaluated by the previously described method. The result is shown in Table 1.

<Production of Positive Electrode>

A planetary mixer was charged with 95 parts of LiCoO$_2$ as a positive electrode active material, 3 parts in terms of solid content of PVDF (polyvinylidene fluoride) as a binder for a positive electrode mixed material layer, 2 parts of acetylene black as a conductive material, and 20 parts of N-methylpyrrolidone as a solvent, and was used to mix these materials to obtain a slurry composition for a lithium ion secondary battery positive electrode (not the presently disclosed slurry composition for an electrochemical device).

The obtained slurry composition for a lithium ion secondary battery positive electrode was applied onto aluminum foil (current collector) of 20 μm in thickness by a comma coater such as to have a thickness after drying of approximately 100 μm. The aluminum foil with the slurry composition for a lithium ion secondary battery positive electrode applied thereon was conveyed inside a 60° C. oven for 2 minutes and inside a 120° C. oven for 2 minutes at a speed of 0.5 m/min in order to dry the slurry composition for a lithium ion secondary battery positive electrode on the aluminum foil and thereby obtain a positive electrode web. The positive electrode web was subsequently rolled by roll pressing to obtain a positive electrode having a positive electrode mixed material layer thickness of 70 μm.

<Preparation of Separator>

A separator made from a single layer of polypropylene (width: 65 mm; length: 500 mm; thickness: 25 μm; produced by a dry method; porosity: 55%) was prepared. The separator was cut out as a square shape of 5.2 cm×5.2 cm to obtain a square separator that was then used in the following lithium ion secondary battery.

<Production of Secondary Battery>

An aluminum packing case was prepared as a battery case. The produced positive electrode was cut out as a square shape of 4.6 cm×4.6 cm to obtain a square positive electrode. The square positive electrode was positioned inside the aluminum packing case such that a surface at the current collector side of the positive electrode was in contact with the aluminum packing case. The prepared separator was positioned on the surface at the positive electrode mixed material layer side of the square positive electrode. In addition, the produced negative electrode was cut out as a square shape of 5 cm×5 cm to obtain a square negative electrode that was then positioned on the separator such that the surface at the negative electrode mixed material layer side of the negative electrode faced the separator. Next, electrolyte solution (solvent: ethylene carbonate (EC)/methyl ethyl carbonate/vinylene carbonate=68.5/30/1.5 (volume ratio); electrolyte:LiPF$_6$ of 1 M in concentration) was injected such that no air remained. The aluminum packing case was then closed by heat sealing at 150° C. to tightly seal an opening of the aluminum packing case, and thereby produce a lithium ion secondary battery. The obtained lithium ion secondary battery was used to evaluate cycle characteristics. The result is shown in Table 1.

Examples 2 to 5 and Comparative Examples 1 to 5

A polymer A, a polymer B, and a slurry composition for an electrochemical device (slurry composition for a negative electrode) were produced, a separator was prepared, and a negative electrode, a positive electrode, and a secondary battery were produced in the same way as in Example 1 with the exception that the types and proportions of monomers used in production of the polymer A were changed as shown in Table 1. Various evaluations were also performed in the same way as in Example 1. The results are shown in Table 1.

Note that the weight-average molecular weight of the polymer A in Comparative Example 5 could not be measured because gelation of the polymer A occurred.

Example 6

A polymer A, a polymer B, and a slurry composition for an electrochemical device (slurry composition for a negative electrode) were produced, a separator was prepared, and a negative electrode, a positive electrode, and a secondary battery were produced in the same way as in Example 1 with the exception that in production of the polymer A in Example 1, the amount of the polymerization initiator was reduced so as to adjust the molecular chain growth reaction and thereby obtain a polymer A having a weight-average molecular weight of 3,500,000. Various evaluations were also performed in the same way as in Example 1. The results are shown in Table 1.

Example 7

A polymer A, a polymer B, and a slurry composition for an electrochemical device (slurry composition for a negative electrode) were produced, a separator was prepared, and a negative electrode, a positive electrode, and a secondary battery were produced in the same way as in Example 1 with the exception that in production of the polymer A in Example 1, the amount of the polymerization initiator was increased so as to adjust the molecular chain growth reaction and thereby obtain a polymer A having a weight-average molecular weight of 100,000. Various evaluations were also performed in the same way as in Example 1. The results are shown in Table 1.

TABLE 1

| | | | Example 1 | Example 2 | Example 3 | Example 4 | Example 5 | Example 6 |
|---|---|---|---|---|---|---|---|---|
| Polymer A | Amide group-containing monomer unit | Type | Acrylamide | Acrylamide | Acrylamide | Acrylamide | Acrylamide | Acrylamide |
| | | Content (mass %) | 70 | 60 | 73 | 74.5 | 90 | 70 |
| | Epoxy group-containing monomer unit | Type | GMA | GMA | GMA | GMA | GMA | GMA |
| | | Content (mass %) | 5 | 15 | 2 | 0.5 | 5 | 5 |
| | Other monomer units | Type | AA | AA | AA | AA | AA | AA |
| | | Content (mass %) | 25 | 25 | 25 | 25 | 5 | 25 |
| | Content of epoxy group-containing monomer unit/ content of amide group-containing monomer unit | | 0.07 | 0.25 | 0.03 | 0.01 | 0.06 | 0.07 |

TABLE 1-continued

|  |  |  |  |  |  |  |  |  |
|---|---|---|---|---|---|---|---|---|
|  | Weight-average molecular weight |  | 800,000 | 800,000 | 800,000 | 800,000 | 800,000 | 3,500,000 |
|  | Content in 100 parts by mass of all solid content in slurry composition (parts by mass) |  | 1.5 | 1.5 | 1.5 | 1.5 | 1.5 | 1.5 |
| Polymer B | Monomer unit: content (mass %) |  | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 |
|  | Content in 100 parts by mass of all solid content in slurry composition (parts by mass) |  | 1.5 | 1.5 | 1.5 | 1.5 | 1.5 | 1.5 |
| Solvent | Type |  | Water | Water | Water | Water | Water | Water |
| Slurry | Type |  | Electrode slurry | Electrode slurry | Electrode slurry | Electrode slurry | Electrode slurry | Electrode slurry |
| Functional layer for electro-chemical device | Type |  | Electrode | Electrode | Electrode | Electrode | Electrode | Electrode |
| Electro-chemical device | Type |  | LIB | LIB | LIB | LIB | LIB | LIB |
| Evaluation | Slurry dispersibility |  | A | B | A | A | A | C |
|  | Coatability (thixotropy) |  | A | A | A | A | C | A |
|  | Electrolyte solution penetrability (electrolyte solution wettability) |  | A | A | B | C | B | A |
|  | Cycle characteristics |  | A | A | B | B | B | A |

|  |  |  | Example 7 | Comparative Example 1 | Comparative Example 2 | Comparative Example 3 | Comparative Example 4 | Comparative Example 5 |
|---|---|---|---|---|---|---|---|---|
| Polymer A | Amide group-containing monomer unit | Type | Aciylamide | Acrylamide | Acrylamide | — | Aciylamide | Aciylamide |
|  |  | Content (mass %) | 70 | 75 | 15 | — | 95 | 70 |
|  | Epoxy group-containing monomer unit | Type | GMA | — | GMA | GMA | GMA | — |
|  |  | Content (mass %) | 5 | — | 60 | 75 | 2 | — |
|  | Other monomer units | Type | AA | AA | AA | AA | AA | Ethylene glycol acrylate |
|  |  | Content (mass %) | 25 | 25 | 25 | 25 | 3 | 25    5 |
|  | Content of epoxy group-containing monomer unit/ content of amide group-containing monomer unit |  | 0.07 | — | 4.00 | ∞ | 0.02 | — |
|  | Weight-average molecular weight |  | 100,000 | 800,000 | 800,000 | 800,000 | 800,000 | Not measurable (gelation) |
|  | Content in 100 parts by mass of all solid content in slurry composition (parts by mass) |  | 1.5 | 1.5 | 1.5 | 1.5 | 1.5 | 1.5 |
| Polymer B | Monomer unit: content (mass %) |  | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 | ST: 62.0 BD: 33.0 IA: 4 2-HEA: 1 |
|  | Content in 100 parts by mass of all solid content in slurry composition (parts by mass) |  | 1.5 | 1.5 | 1.5 | 1.5 | 1.5 | 1.5 |
| Solvent | Type |  | Water | Water | Water | Water | Water | Water |
| Slurry | Type |  | Electrode slurry | Electrode slurry | Electrode slurry | Electrode slurry | Electrode slurry | Electrode slurry |
| Functional layer for electro-chemical device | Type |  | Electrode | Electrode | Electrode | Electrode | Electrode | Electrode |
| Electro-chemical device | Type |  | LIB | LIB | LIB | LIB | LIB | LIB |

TABLE 1-continued

| Evaluation | | | | | | | |
|---|---|---|---|---|---|---|---|
| | Slurry dispersibility | A | B | D | D | D | D |
| | Coatability (thixotropy) | B | C | C | C | D | D |
| | Electrolyte solution penetrability (electrolyte solution wettability) | A | D | B | C | C | D |
| | Cycle characteristics | A | C | C | C | C | D |

In Table 1: "GMA" represents "glycidyl methacrylate"; "AA" represents "acrylic acid", "ST" represents "styrene", "BD" represents "butadiene"; "IA" represents "itaconic acid"; "2-HEA" represents "2-hydroxyethyl acrylate"; and "LIB" represents "lithium ion battery".

Examples 1 to 7 and Comparative Examples 1 to 5 in Table 1 demonstrate that by using a binder composition for an electrochemical device that contains water and a polymer A including a specific amount of an amide group-containing monomer unit and a specific amount of an epoxy group-containing monomer unit, it is possible to improve the slurry dispersibility and coatability (thixotropy) of a produced slurry composition for an electrochemical device, and to improve the electrolyte solution penetrability (electrolyte solution wettability) and cycle characteristics of an electrochemical device including a functional layer that is formed using the produced slurry composition for an electrochemical device.

INDUSTRIAL APPLICABILITY

According to the present disclosure, it is possible to provide a slurry composition for an electrochemical device having excellent coatability and a binder composition for an electrochemical device with which the slurry composition can be produced.

Moreover, according to the present disclosure, it is possible to provide a functional layer for an electrochemical device that can cause an electrochemical device to display excellent cycle characteristics and an electrochemical device that includes the functional layer for an electrochemical device.

The invention claimed is:

1. A binder composition for an electrochemical device comprising a polymer A and water, wherein
   the polymer A includes an amide group-containing monomer unit and an epoxy group-containing monomer unit,
   content of the amide group-containing monomer unit in the polymer A is not less than 30 mass % and not more than 90 mass %,
   content of the epoxy group-containing monomer unit in the polymer A is not less than 0.1 mass % and not more than 50 mass %, and
   a mass ratio of the epoxy group-containing monomer unit relative to the amide group-containing monomer unit is 0.01 or more and 0.25 or less.

2. The binder composition for an electrochemical device according to claim 1, wherein the polymer A has a weight-average molecular weight of not less than 50,000 and not more than 5,000,000.

3. A slurry composition for an electrochemical device comprising the binder composition for an electrochemical device according to claim 1.

4. The slurry composition for an electrochemical device according to claim 3, further comprising an electrode active material.

5. A functional layer for an electrochemical device formed using the slurry composition for an electrochemical device according to claim 3.

6. An electrochemical device comprising a positive electrode, a negative electrode, a separator, and an electrolyte solution, wherein
   at least one of the positive electrode, the negative electrode, and the separator includes the functional layer for an electrochemical device according to claim 5.

* * * * *